(12) United States Patent
Park et al.

(10) Patent No.: US 10,415,634 B2
(45) Date of Patent: Sep. 17, 2019

(54) AIR FOIL BEARING

(71) Applicant: Hanon Systems, Daejeon (KR)

(72) Inventors: Chi Yong Park, Daejeon (KR); Gun Woong Park, Daejeon (KR); Hyun Sup Yang, Daejeon (KR); Pil Gon Song, Daejeon (KR); Han Seok Mun, Daejeon (KR); Hwan Myeong Jung, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 15/574,443

(22) PCT Filed: Nov. 18, 2016

(86) PCT No.: PCT/KR2016/013329
§ 371 (c)(1),
(2) Date: Nov. 15, 2017

(87) PCT Pub. No.: WO2017/086732
PCT Pub. Date: May 26, 2017

(65) Prior Publication Data
US 2018/0291950 A1 Oct. 11, 2018

(30) Foreign Application Priority Data

Apr. 11, 2016 (KR) .................. 10-2016-0044117

(51) Int. Cl.
*F16C 17/04* (2006.01)
*F04D 29/051* (2006.01)
(Continued)

(52) U.S. Cl.
CPC .......... *F16C 17/042* (2013.01); *F04D 17/10* (2013.01); *F04D 29/0513* (2013.01); *F01D 25/16* (2013.01); *F16C 2360/24* (2013.01)

(58) Field of Classification Search
CPC .................................................. F16C 17/042
See application file for complete search history.

(56) References Cited

U.S. PATENT DOCUMENTS 4,277,111 A * 7/1981 Gray ..................... F16C 17/042
384/124
4,277,112 A * 7/1981 Heshmat ............... F16C 17/042
384/124
(Continued)

FOREIGN PATENT DOCUMENTS

JP H06505547 A 6/1994
JP 2015059630 A 3/2015
(Continued)

OTHER PUBLICATIONS

International Search Report issued in PCT/KR2016/013329 dated Mar. 8, 2017.

*Primary Examiner* — Thomas R Hannon
(74) *Attorney, Agent, or Firm* — Norton Rose Fulbright US LLP

(57) ABSTRACT

Air foil bearing capable of adjusting stiffness of single bumps by varying widths of the single bumps. Since the bumps have the same height in an initial stage, a wedging effect is implemented only when a load is applied thereto by an oil film. Therefore, the air foil bearing is advantageous in terms of height management thereof. In addition, it is possible to stably dampen shocks applied in the direction of rotation of a rotor, to improve a support capability, and to reduce shocks due to damping. Therefore, it is possible to enhance durability of the air foil bearing.

12 Claims, 11 Drawing Sheets

(51) Int. Cl.
*F04D 17/10* (2006.01)
*F01D 25/16* (2006.01)

(56) References Cited

U.S. PATENT DOCUMENTS

| | | | | |
|---|---|---|---|---|
| 4,277,113 A | * | 7/1981 | Heshmat | F16C 17/024 |
| | | | | 384/124 |
| 5,110,220 A | * | 5/1992 | Gu | F16C 27/08 |
| | | | | 384/105 |
| 5,248,205 A | * | 9/1993 | Gu | F16C 17/042 |
| | | | | 384/106 |
| 5,318,366 A | * | 6/1994 | Nadjafi | F16C 27/02 |
| | | | | 384/105 |
| 5,871,284 A | * | 2/1999 | Nadjafi | F16C 17/042 |
| | | | | 384/105 |
| 2012/0281936 A1 | | 11/2012 | Heshmat et al. | |
| 2016/0195128 A1 | * | 7/2016 | Omori | F16C 17/042 |
| | | | | 384/105 |

FOREIGN PATENT DOCUMENTS

| | | | |
|---|---|---|---|
| KR | 20010063915 | A | 7/2001 |
| KR | 20050105752 | | 11/2005 |
| KR | 100604132 | B1 | 7/2006 |
| KR | 100954066 | B1 | 4/2010 |
| KR | 101396889 | B1 | 5/2014 |
| KR | 101558489 | B1 | 10/2015 |
| WO | 2014133499 | A2 | 9/2014 |
| WO | 2015115464 | A1 | 8/2015 |

\* cited by examiner

[Fig. 4]
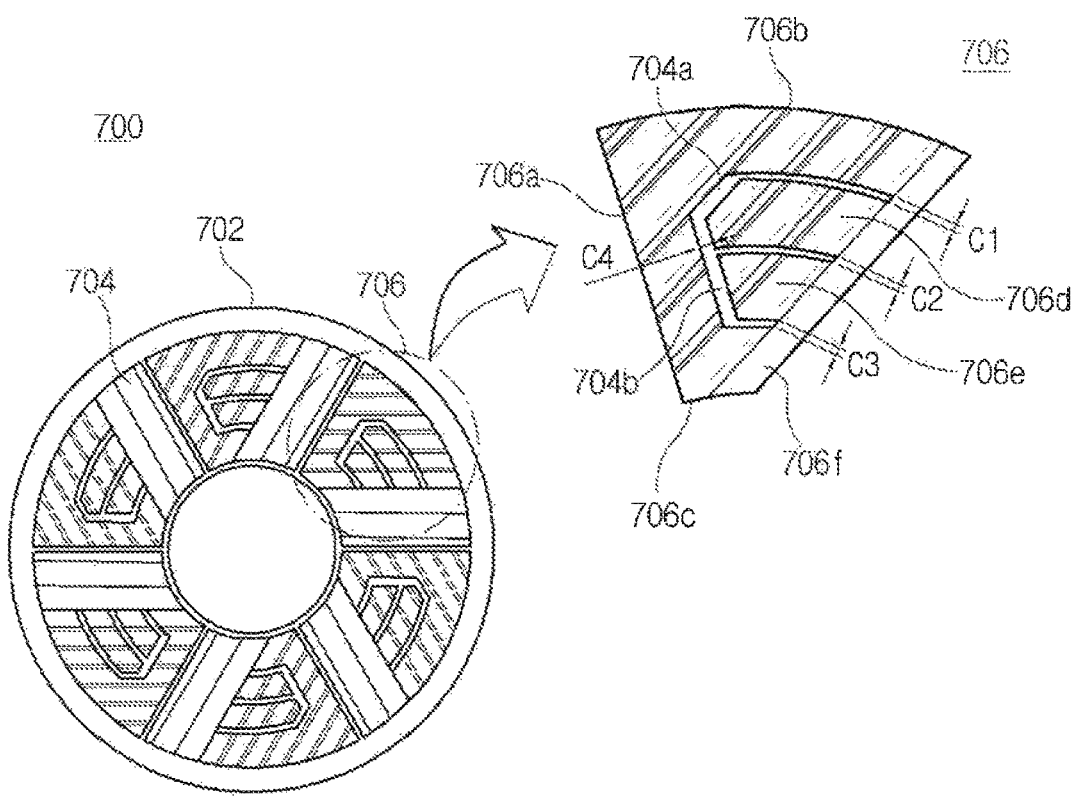

[Fig. 5]
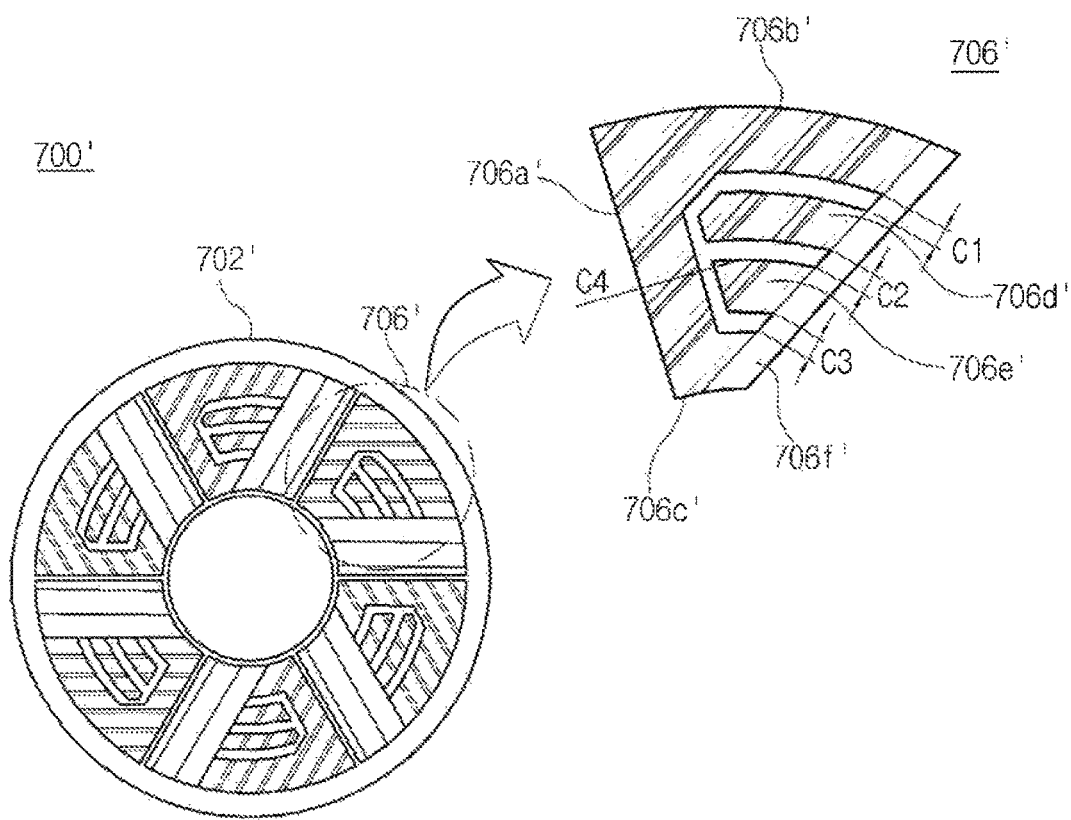

[Fig. 6]
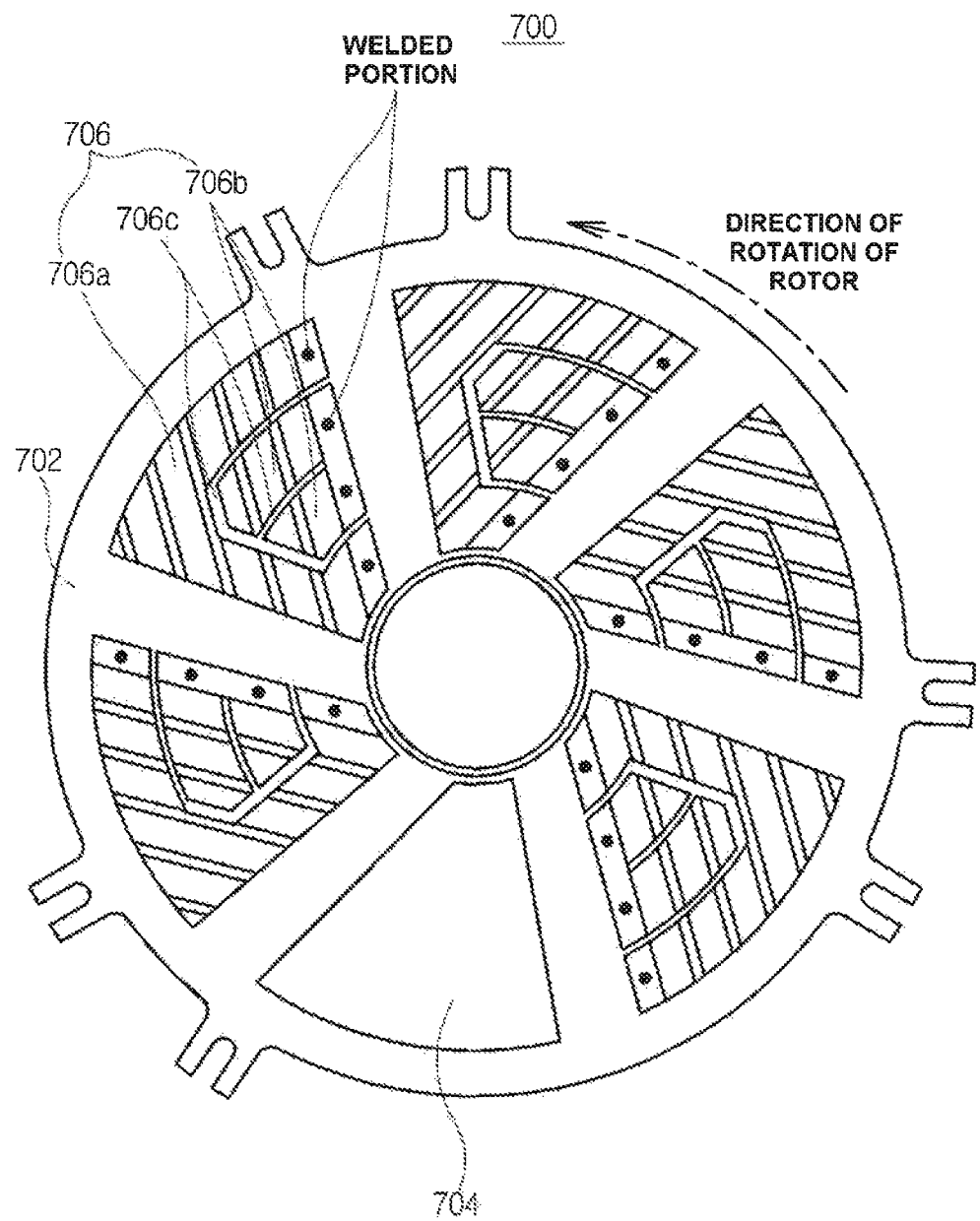

[Fig. 7]
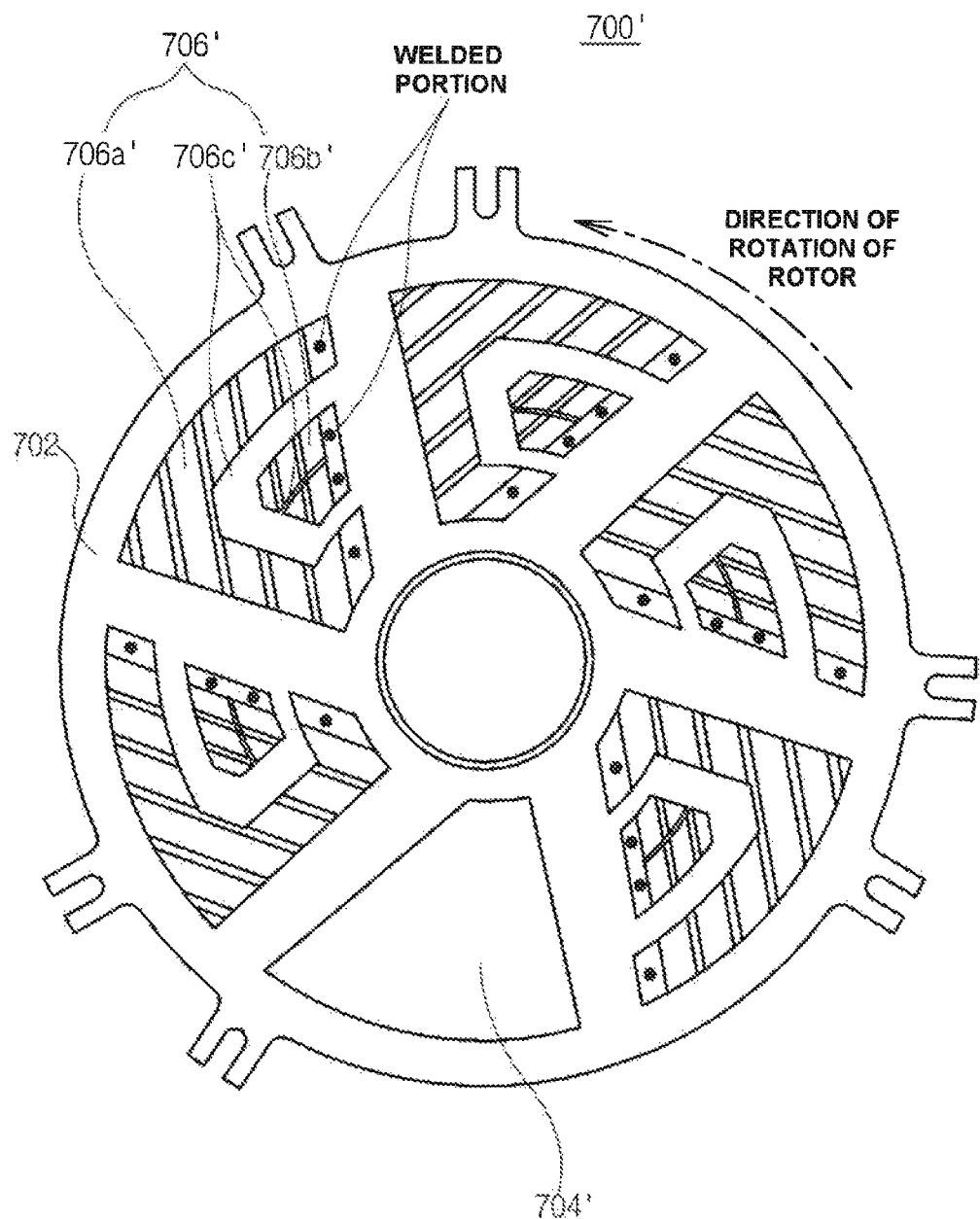

[Fig. 8]
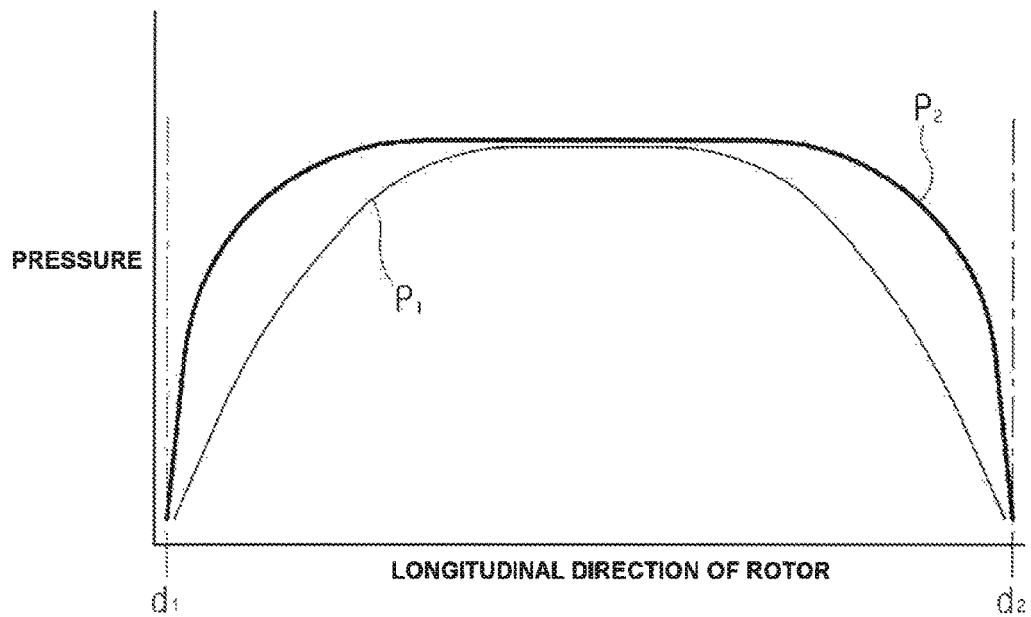

[Fig. 9]
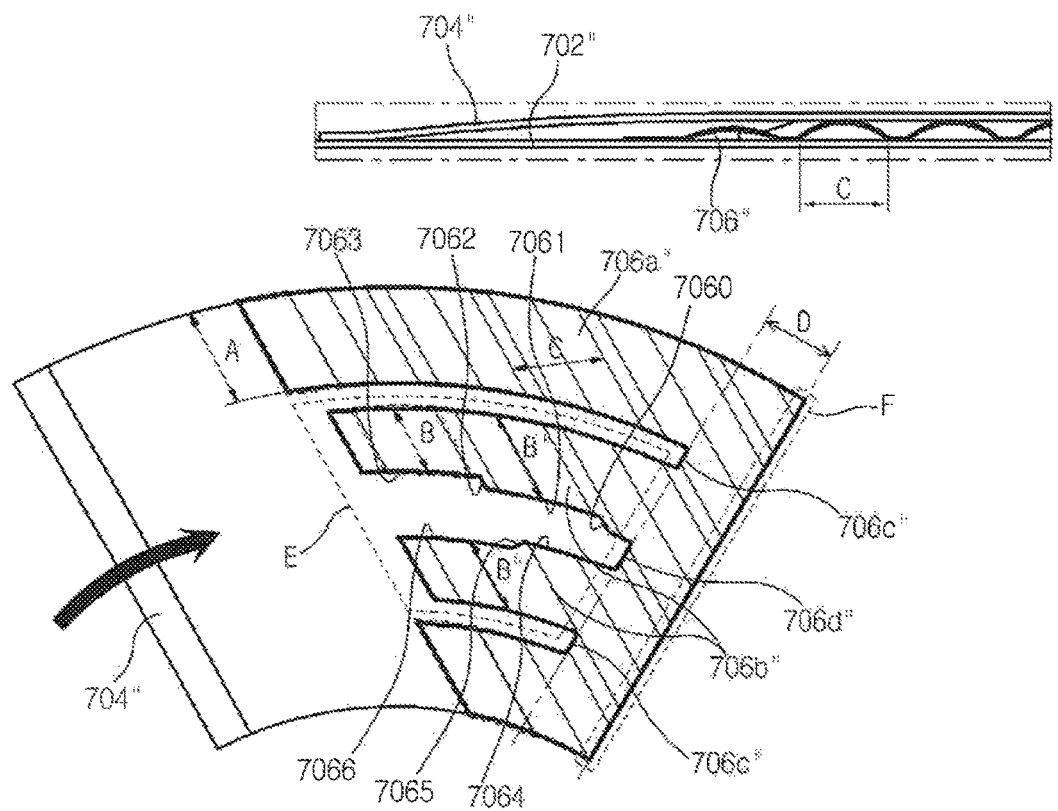

[Fig. 10]
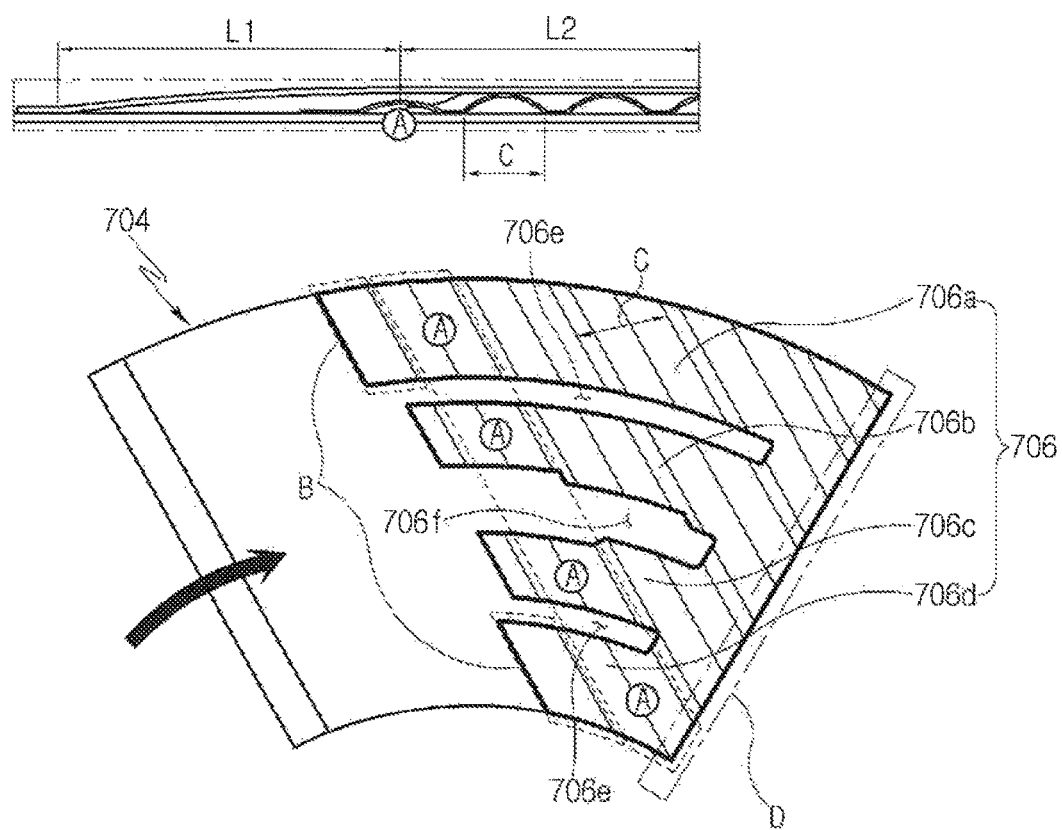

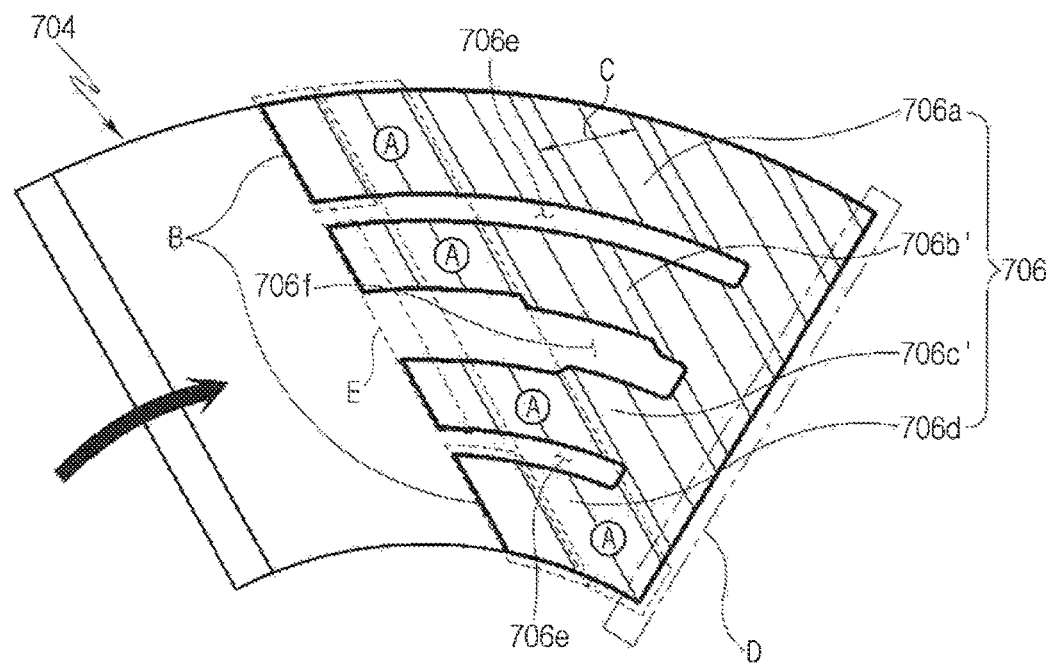
[Fig. 11]

AIR FOIL BEARING

CROSS-REFERENCES TO RELATED APPLICATIONS

This application is a 371 of International Application No. PCT/KR2016/013329 filed Nov. 18, 2016, which claims priority from Korean Patent Application Nos. 10-2015-0161838 filed on Nov. 18, 2015, 10-2015-0166595 filed on Nov. 26, 2015, 10-2016-0034023 filed on Mar. 22, 2016 and 10-2016-0044117 filed on Apr. 11, 2016.

BACKGROUND OF THE INVENTION

Field of the Invention

Exemplary embodiments of the present invention relate to an air foil bearing, and more particularly, to an air foil bearing capable of implementing stiffness control and a wedging effect.

Description of the Related Art

A bearing is a mechanical element that fixes a rotary shaft at a certain position and rotatably supports the shaft while supporting a self-load of the shaft and a load applied to the shaft. A ball bearing or a journal bearing is a bearing that supports a shaft using an oil film, and a foil bearing is a bearing that supports a shaft using a high-pressure air layer formed between a top foil and the shaft.

An air foil bearing supports an axial load by forming a pressure with air, as a viscous fluid, introduced between foils coming into contact with a rotor or a bearing disc when the rotor rotates at high speed.

Since the air foil bearing is effective to support a rotary shaft rotating at high speed, it is applicable to a rotary shaft rotating at high speed in a rotating machine such as a turbo compressor, a turbo cooler, a turbo generator, or an air compressor.

Korean Patent No. 1396889 discloses an example of such an air foil bearing.

This air foil bearing typically has a structure in which a bump foil and a top foil are disposed between a pair of disc-shaped plates. Since the load support capability of the air foil bearing is determined by the total pressure of air formed in the bearing, there is a need to increase the total pressure. However, it is difficult for a conventional air foil bearing to improve a load support capability because it does not have a structure to increase the pressure of air.

RELATED ART DOCUMENT

Patent Document (Patent Document) Korean Patent No. 1396889 (May 13, 2015)

SUMMARY OF THE INVENTION

An object of the present invention is to provide an air foil bearing capable of enhancing damping efficiency.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, an air foil bearing is an air foil bearing for rotatably supporting a rotary shaft. The air foil bearing includes a disc-shaped plate, a plurality of bump foils coupled to the plate, and a top foil disposed above each of the bump foils while one end of the top foil is coupled to the plate and the other end thereof is a free end.

Each of the bump foils may include a plurality of single bumps spaced apart from each other in a plurality of rows, and the single bumps may have the same stiffness or stiffness gradually increased from an inner diameter side of the plate to an outer diameter side thereof.

Widths (A to D) of respective rows of the single bumps may be gradually increased toward the outer diameter side of the plate, or the single bumps may have larger widths (A to D) at the outer diameter side of the plate rather than at the inner diameter side thereof.

The single bumps may have lengths of bump ridges (L) gradually increased from the inner diameter side of the plate to the outer diameter side thereof.

The single bumps disposed at the inner and outer diameter sides of the plate may have longer arc lengths than the single bumps disposed inward.

Each of the bump foils may include first to fifth single bumps obliquely arranged radially of the plate, the first to fifth single bumps may form first to fourth rows and are spaced apart from each other, and the single bumps may have the same stiffness or stiffness gradually increased from an inner diameter side of the plate to an outer diameter side thereof.

Widths (A to D) of the first to fourth rows of the single bumps may be gradually increased toward the outer diameter side of the plate.

Widths (C and D) of the third and fourth rows of the single bumps may be larger than widths (A and B) of the first and second rows of the single bumps.

The single bumps may have lengths of bump ridges (L) gradually increased from the inner diameter side of the plate to the outer diameter side thereof.

Arc lengths of the first and fourth rows of the single bumps may be longer than arc lengths of the second and third rows of the single bumps.

In accordance with another aspect of the present invention, an air foil bearing is an air foil bearing for rotatably supporting a rotary shaft. The air foil bearing includes a disc-shaped plate, a plurality of bump foils coupled to the plate, and a top foil disposed above each of the bump foils while one end of the top foil is coupled to the plate and the other end thereof is a free end. Each of the bump foils includes a first foil, and a second foil arranged within the first foil.

The first and second foils may be spaced apart from each other with a slit interposed therebetween.

The first foil may have a higher stiffness than the second foil.

The first and second foils may be made of different materials.

The first and second foils may be made of the same material.

The first foil may have a larger thickness than the second foil.

The first foil may have a smaller bump width than the second foil.

The second foil may have a slit formed therein to bisect the width thereof, and the width of the slit between the first foil and the second foil may correspond to the width of the slit of the second foil.

Alternatively, the second foil may have a slit formed therein to bisect the width thereof, and the width of the slit between the first foil and the second foil may be larger than the width of the slit of the second foil.

The first and second foils may consist of a plurality of foils, and the first and second foils may be disposed with a second slit interposed therebetween, the second slit having different widths and shapes.

The first slit between the first foil and the second foil may have the same width from one end thereof from the other end thereof.

The second slit between the second foils may have a width increased in a direction opposite to a trailing edge (F) connecting the first and second foils from the trailing edge (F) in an end of the second slit in the direction of rotation of the rotor.

Alternatively, the second slit between the second foils may have a stepped width increased in the direction opposite to the trailing edge (F).

The second foil may have a smaller width at an end thereof opposite to the trailing edge (F) than an end thereof toward the trailing edge (F).

The second foil may include at least one stepped portion cut in a stepped form at facing one side thereof, and a connection portion extending in the direction of rotation of the rotor to connect the stepped portion.

An end of the first foil opposite to the trailing edge (F) is coupled by spot welding.

The first foil may have a smaller bump height than the second foil.

A distance (D) from an end of the slit toward the trailing edge (F) to the trailing edge (F) may be less than or equal to twice a bump pitch (C).

In accordance with a further aspect of the present invention, an air foil bearing is an air foil bearing for rotatably supporting a rotary shaft. The air foil bearing includes a disc-shaped plate, a plurality of bump foils coupled to the plate, and a top foil disposed above each of the bump foils while one end of the top foil is coupled to the plate and the other end thereof is a free end, wherein each of the bump foils includes first to fourth foils extending in a direction opposite to a direction of rotation of a rotor.

Ends of the first to fourth foils corresponding to the direction of rotation of the rotor may be connected as one piece.

A leading ridge (A) of each of the first to fourth foils, which is adjacent to an end thereof in a direction opposite to the direction of rotation of the rotor, may have a height different from another adjacent bump ridge.

The height of the leading ridge (A) of each of the first to fourth foils may be lower than the height of another adjacent bump ridge.

The height of the leading ridge (A) of each of the first to fourth foils may be set to be within 70% of the height of another adjacent bump ridge.

The top foil may have an inclined section (L1) in which a gap between the top foil and the plate is gradually increased, and a flat section (L2) in which the gap therebetween is constant.

The leading ridge (A) of each of the first to fourth foils may correspond to a starting position of the flat section (L2) of the top foil.

An end (B) adjacent to the leading ridge (A) of each of the first to fourth foils may be coupled to the plate by spot welding.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a top view illustrating an air foil bearing according to a second embodiment of the present invention;

FIG. 5 is a top view illustrating an air foil bearing according to a third embodiment of the present invention;

FIGS. 6 and 7 are top views illustrating a welded portion of an air foil bearing according to different embodiments of the present invention;

FIG. 8 is a graph illustrating a pressure distribution according to the air foil bearing of FIG. 6;

FIG. 9 is a top view illustrating an air foil bearing according to a fourth embodiment of the present invention;

FIG. 10 is a top view illustrating an air foil bearing according to a fifth embodiment of the present invention; and FIG. 11 is a top view illustrating an air foil bearing according to a sixth embodiment of the present invention.

DESCRIPTION OF SPECIFIC EMBODIMENTS

Figure 1:
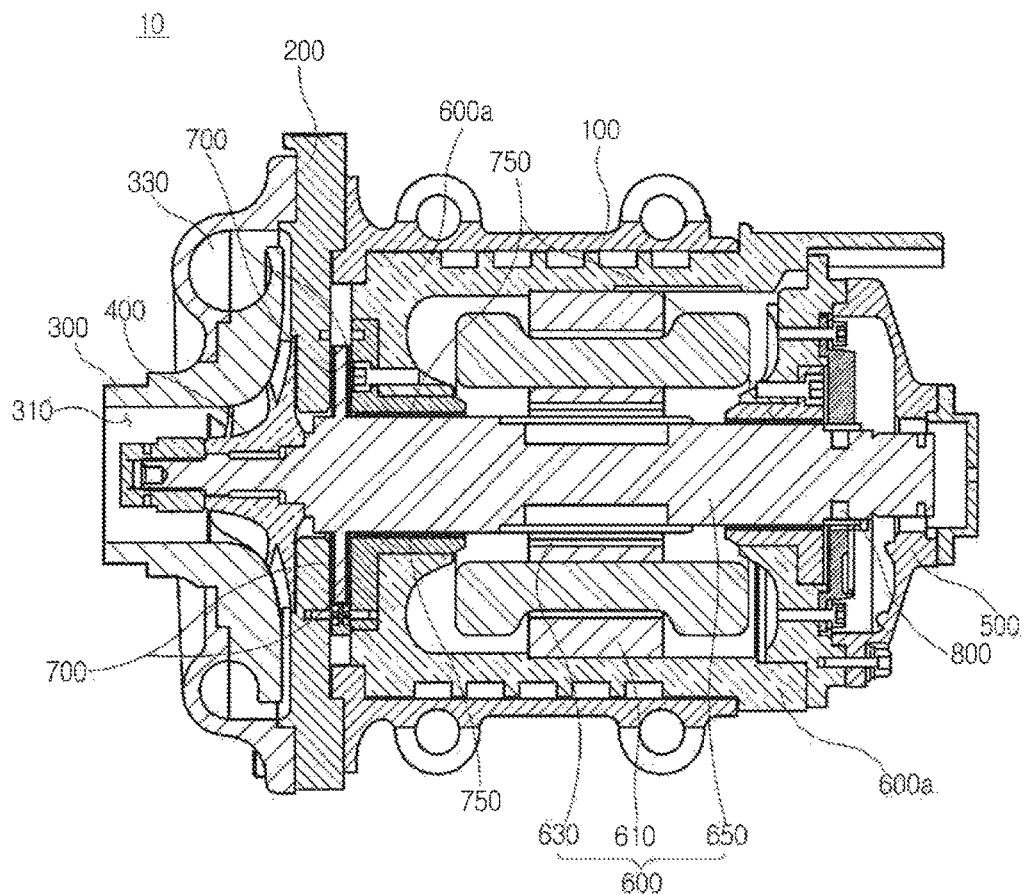
FIG. 1 is a cross-sectional view illustrating an installation example of an air foil bearing according to embodiments of the present invention.

Reference will now be made in detail to exemplary embodiments of the present invention, examples of which are illustrated in the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, an air foil bearing according to an embodiment of the present invention will be described in detail with reference to the accompanying drawings.

FIG. 1 is a cross-sectional view illustrating an installation example of an air foil bearing according to an embodiment of the present invention.

As illustrated in FIG. 1, the air foil bearing according to the embodiment of the present invention is installed in a machine having a rotary shaft rotating at high speed. Herein, an example, in which an air foil bearing 700 is installed to support a rotary shaft 650 of a blower motor 600 mounted in an air compressor 10, will be described for convenience (however, this is merely by way of example, and it may be applied to any machine having a rotating shaft).

The air compressor 10 for a vehicle includes a housing 100 that defines the external appearance thereof, an impeller 400 that is coupled to the front of the housing 100 to compress air, an impeller receiving part 200 and an impeller housing 300 for receiving the impeller 400, a rear cover 500 that is coupled to the rear of the housing 100, and a blower motor 600 that is installed in the housing 100 to rotatably drive the impeller 400.

The impeller housing 300 has an air inlet 310 formed at the center of the front thereof for introduction of outside air, and air outlets 330 formed at both sides of the front thereof. The impeller 400 is installed in the impeller housing 300, and a rotary shaft 650 of the blower motor 600, which will be described later, is coupled through the hollow of the impeller 400. That is, the impeller 400 is supported by the rotary shaft 650. The air introduced through the air inlet 310 by the impeller 400 is compressed by the impeller 400 and is then discharged to the air outlets 330.

The blower motor 600 is inserted into a motor housing 600a inserted into the housing 100. The blower motor 600 includes a stator 630 that is installed adjacent to the inner peripheral surface of the motor housing 600a and has a hollow (not shown), a rotary shaft 650 that is installed through the hollow of the stator 630, and a rotor 610 that is coupled to the outer peripheral surface of the rotary shaft 650.

The rotary shaft 650 is rotatably supported by a thrust bearing 700 and a journal bearing 750, which are installed behind the impeller 400, within the housing 100 in a state in which one end of the rotary shaft 650 is coupled through the hollow of the impeller 400, and the rear end of the rotary shaft 650 is also rotatably supported by a rear bearing 800.

Hereinafter, the air foil bearing according to an embodiment of the present invention will be described in more detail with reference to the accompanying drawings.

Figure 2:
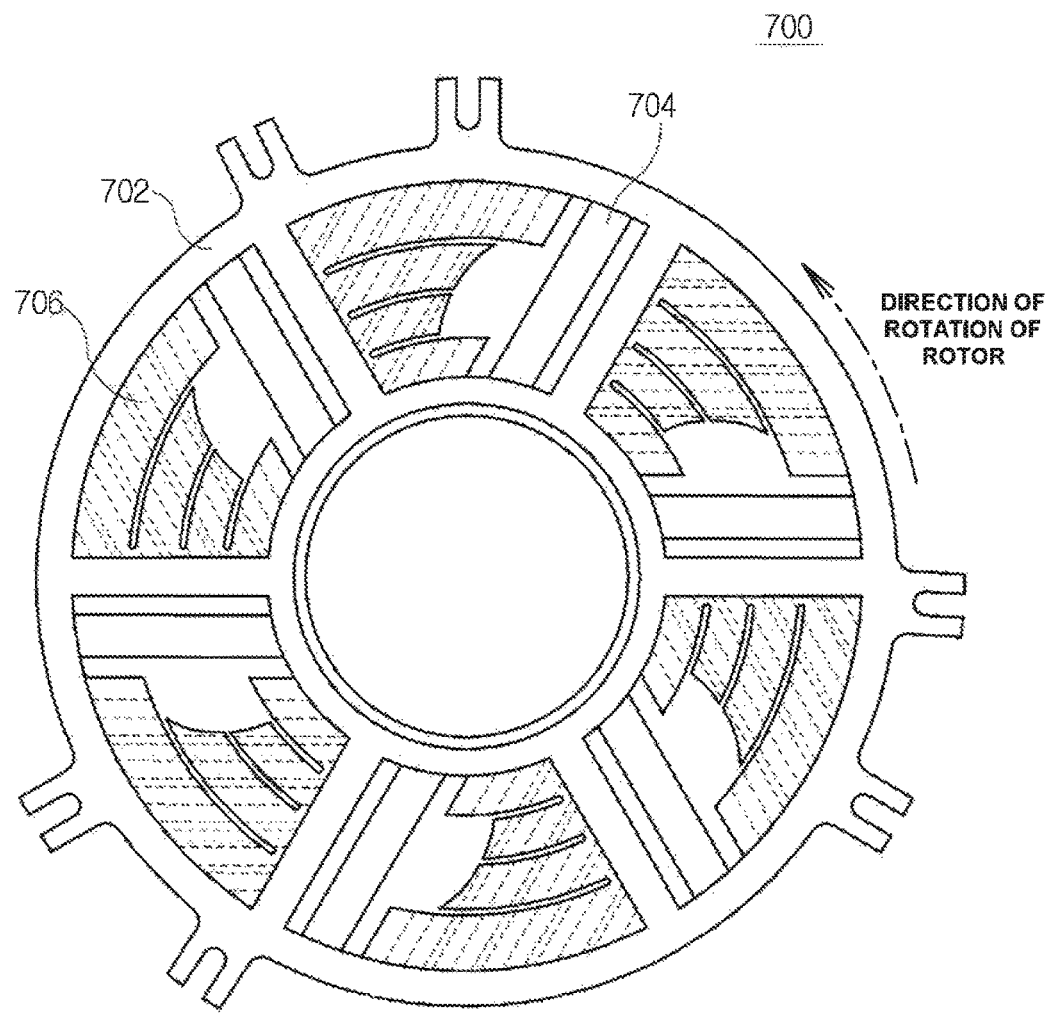
FIG. 2 is a top view illustrating an air foil bearing according to a first embodiment of the present invention.
Figure 3:
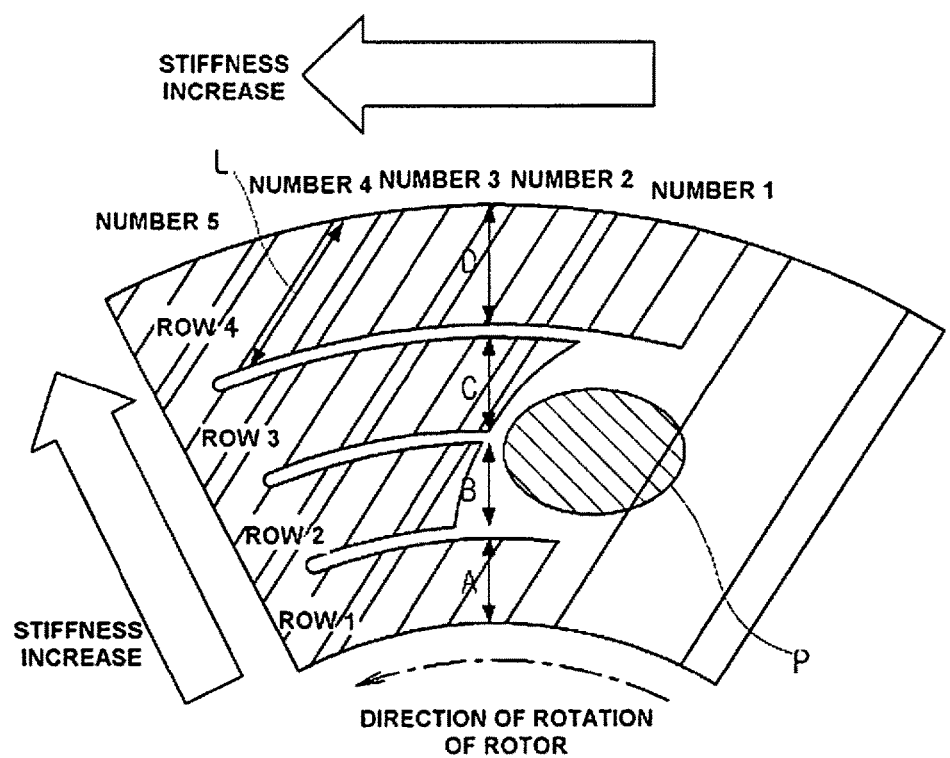
FIG. 3 is a view schematically illustrating a bump foil of FIG. 2.

FIG. 2 is a top view illustrating the air foil bearing according to the embodiment of the present invention. FIG. 3 is a view schematically illustrating a bump foil of FIG. 2.

A rotor disc (not shown) having a disc shape is formed in front of the rotary shaft 650, and the thrust bearing 700 is inserted adjacent to one surface in front of and the other surface behind the rotor disc (see FIG. 1).

As illustrated in FIGS. 2 and 3, the thrust bearing 700 according to the embodiment of the present invention is an air foil bearing, and has a structure in which a plurality of bump foils 706 having a fan shape are seated to a disc-shaped plate 702 and each is covered with a top foil 704. The thrust bearing 700 has a circular hole formed in the center thereof for insertion of the rotary shaft 650. In a state in which the rotary shaft 650 is inserted into the hole of the thrust bearing 700, one surface of each of the bump foils 706 is adjacent to one surface of the rotor disc and the other surface thereof is seated to the plate 702.

One end of the top foil 704 is fixed to the plate 702 and the other end thereof is spaced from the plate 702 to be a deformable free end. The bump foil 706 is a fan-shaped plate, and is in contact with the top foil 704 between the fixed end and the free end of the top foil 704. The top foil 704 and the bump foil 706 are attached to the plate 702 by welding.

Air is introduced between air foils in the rotor disc along with the high-speed rotation of the rotor 630 to form a pressure therebetween, thereby supporting a load during the rotation of the rotor. In this case, the air has characteristics of a viscous fluid. That is, this expression means that air does not have viscosity in practice, but it has viscosity when supporting a load by introduction of air between air foils.

In thrust bearings 700 having the same pitch, height, length, and thickness, a load support capability is affected by the stiffness of the bump foil 706 as well as the viscosity of air.

The stiffness of each of the bump foils 706 is determined by the area of a bump projected on the plane. It is preferable that the stiffness of the bump foil 706 be uniform in all sides of the plate 702 or be gradually increased from the inner diameter side of the plate 702 to the outer diameter side thereof (from row 1 to row 4). The reason is because, when the rotor rotates, a load is concentrated in the direction of row 4 to thereby cause severe abrasion. Accordingly, it is advantageous in terms of durability for the stiffness of the bump foil 706 to increase in the direction of row 4.

However, a conventional bump foil is configured such that the rows thereof have the same width (see A, B, C, and D in FIG. 3). In this case, single bumps (see numbers 1 to 5 of FIG. 3, they being designated in sequential order by numbers 1 to 5 in the direction of rotation of a rotor) have different stiffnesses. Especially, it is very disadvantageous in terms of uniform stiffness distribution since the stiffness at the outer diameter side of each bump is lower than that at the inner diameter side of the bump on the basis of the direction of rotation of the rotor. Accordingly, if the rows of the single bumps have the same width (see A, B, C, and D in FIG. 3) as in the related art, it is impossible for the stiffness of the bump foil to be uniform or be gradually increased in the direction in which a load is increased.

Accordingly, to resolve this problem in the present invention, diagonal lengths (bump ridges, which are convexly formed when viewing the single bumps from the side, they being designated by reference numeral L) of single bumps (1 to 5) have to be adjusted, and the diagonal lengths (L) may be changed by adjusting widths (A to D) of respective rows of the single bumps (1 to 5) (in this case, the single bumps are designed to have the same bump ridge height).

When, in the widths (A to D) of the respective rows of the single bumps (1 to 5), the respective widths of rows 1 to 4 are set as A, B, C, and D, A may be equal to B, C may be larger than A and B, and D may be larger than C (A=B<C<D).

When the single bumps have the widths described above, the lengths of the bump ridges (L) are increased from owl to row 4 and the areas of the single bumps are also increased, thereby increasing a load support capability.

In addition, it is possible to implement a wedging effect of preventing a leak of air forming an oil film by adjusting the lengths of the single bumps (1 to 5) (arc lengths of rows 1 to 4 in the direction of rotation of the rotor).

That is, by forming the lengths of the single bumps (1 to 5) such that the rows 2 and 3 are tensioned inward of the rows 1 and 4, the area of an air pocket (P) for capturing air between the top foil 704 and the bump foil 706 is increased. Thus, it is possible to prevent a loss of the oil film by the wedging effect. Here, the wedging effect means a dynamic pressure (pressure) is generated while a fluid is pulled by the viscosity thereof when the space storing the fluid is narrowed in a wedging manner, in which case the fluid is pushed into a wedge gap, so that a load is supported by the pressure. In addition, a damping force is improved as the area of the air pocket (P) is increased, with the consequence that the non-contact area of the top foil 704 is increased. Therefore, it is possible to reduce friction applied to the top foil 704.

According to the above-mentioned configuration, since the bump foils 706 have the same bump ridge height in an initial stage, the wedging effect is implemented only when a load is applied thereto by the oil film. Therefore, the thrust bearing 700 is advantageous in terms of height management thereof.

In addition, in the case where the single bumps have the same shape, the stiffness of the single bumps is increased when the widths of the single bumps are increased. Thus, it is possible to adjust the stiffness of the single bumps by varying the widths of the single bumps under the condition that the single bumps have the same shape.

As is apparent from the above description, an air foil bearing according to exemplary embodiments of the present invention can adjust stiffness of single bumps by varying widths of the single bumps. In addition, since the bumps have the same height in an initial stage, a wedging effect is implemented only when a load is applied thereto by an oil film. Therefore, the air foil bearing is advantageous in terms of height management thereof.

FIG. 4 is a top view illustrating an air foil bearing according to a second embodiment of the present invention. FIG. 5 is a top view illustrating an air foil bearing according to a third embodiment of the present invention.

As illustrated in FIG. 4, a thrust bearing 700 according to a second embodiment of the present invention is an air foil bearing, and has a structure in which a plurality of bump foils 706 having a fan shape are seated to a disc-shaped plate 702 and each is covered with a top foil 704. The thrust bearing 700 has a circular hole formed in the center thereof for insertion of a rotary shaft 650. In a state in which the rotary shaft 650 is inserted into the hole of the thrust bearing 700, one surface of each of the bump foils 706 is adjacent to one surface of a thrust disc 652 and the other surface thereof is seated to the plate 702.

One end of the top foil 704 is fixed to the plate 702 and the other end thereof is spaced from the plate 702 to be a deformable free end. The fixed end of the top foil 704 is attached to the plate 702 by welding.

The bump foil 706 is a fan-shaped plate, and is in contact with the top foil 704 between the fixed end and the free end of the top foil 704. The bump foil 706 consists of two foils, which are a "⊏"-shaped foil forming the edge of the fan-shaped bump foil and a foil arranged within the "⊏"-shaped foil.

In more detail, the bump foil 706 includes a connection foil 706a that forms the radial edge of the fan-shaped bump foil, a first foil 706b that forms the outer diameter edge of the fan-shaped bump foil, a second foil 706c that forms the inner diameter edge of the fan-shaped bump foil, and third and fourth foils 706d and 706e that are spaced between the first foil 706b and the second foil 706c with slits C1 to C3 interposed therebetween. The free end of each of the third and fourth foils 706d and 706e is also spaced apart from the connection foil 706a with a slit C4 interposed therebetween. A portion of the edge of the third foil 706d is diagonally cut, and the portion between the first foil 706b and the connection foil 706a is diagonally cut corresponding to the diagonally-cut portion. The diagonally-cut portions are spaced apart from each other with a cut slit 704a interposed therebetween. The ends of the first to fourth foils 706b, 706c, 706d, and 706e are welded to the plate 702 (wherein, their welded portions will be described later), and the other ends thereof extend in an arc direction of the fan-shaped bump foil.

The lengths of the first to fourth foils 706b, 706c, 706d, and 706e are shortened from the first foil 706b to the fourth foil 706e. The third and fourth foils 706d and 706e are disposed at the side that is less vulnerable to the pressure generated during rotation of the rotor, compared to the first and second foils 706b and 706c. Therefore, the third and fourth foils 706d and 706e are preferably made of a material having lower stiffness than the first and second foils 706b and 706c. Although the first to fourth foils 706b, 706c, 706d, and 706e are made of the same material, the third and fourth foils 706d and 706e may have lower stiffness than the first and second foils 706b and 706c in such a way to widen the width of the bump forming the third and fourth foils 706d and 706e and to increase an amount of deformation of the bump forming the third and fourth foils 706d and 706e than that of the bump forming the first and second foils 706b and 706c.

Since the amount of deformation of the third and fourth foils 706d and 706e is increased when the third and fourth foils 706d and 706e have lower stiffness than the first and second foils 706b and 706c, it is possible to capture a large amount of air to thereby increase a load support capability.

Meanwhile, the above slits consist of a first slit C1, a second slit C2, a third slit C3, and a fourth slit C4. The first to third slits C1 to C3 serve to maintain a minimum gap such that the first to fourth foils 706b, 706c, 706d, and 706e do not come into contact with one another.

Preferably, the fourth slit C4 has a gap such that the third and fourth foils 706d and 706e do not come into contact with the connection foil 706a even though the bump ridges of the third and fourth foils 706d and 706e are pressed so that the third and fourth foils 706d and 706e are tensioned when the bump foil 706 is deformed. In addition, fluids are introduced in an axial direction and a direction of rotation of the rotor when the rotor rotates. In this case, it is possible to form a space for stable movement of the fluids when the fluids are simultaneously or randomly introduced into the fourth slit C4 and the first to third slits C1 to C3, thereby enhance a stable damping capability.

All of the first to third slits C1 to C3 are formed in the circumferential direction of the plate 702, and the fourth slit C4 is radially formed. Therefore, it is possible to stably dampen vibration due to introduction and discharge of fluid.

As illustrated in FIG. 5, a thrust bearing 700' according to a third embodiment of the present invention has the same configuration as that according to the above second embodiment, but first to third slits C1 to C3 according to the third embodiment are set to have a gap different from those according the second embodiment.

That is, the first to third slits C1 to C3 may be designed to have the same gap as a fourth slit C4.

In this case, third and fourth foils 706d' and 706e' have a relatively smaller width than first and second foils 706b' and 706c'. This enables the third and fourth foils 706d' and 706e' to perform damping different from the first and second foils 706b' and 706c'. Through such a configuration, the axial stress applied to the rotor is stably supported and distributed to prevent damage of the bearing.

Since the first to third slits C1 to C3 have the same gap as the fourth slit C4, the thrust bearing 700' according to the third embodiment of the present invention has a damping capability and a load support capability different from that according to the second embodiment.

Thus, since an amount of damping varies and amounts of deformation of the third and fourth foils 706d' and 706e' are increased, it is possible to minimize stress concentration and a load in the axial direction due to introduction and movement of fluid.

Therefore, it is possible to minimize vibration applied to the rotor and thus to enhance an efficiency for vibration damping. In addition, the bearing can be stably used for a long time by minimizing vibration and shocks applied to a compressor or an air blower and simultaneously enhancing durability and capability for vibration damping.

The welded portion of the air foil bearing according to the embodiments of the present invention having the above configuration will be described in detail.

FIGS. 6 and 7 are top views illustrating a welded portion of an air foil bearing according to different embodiments of the present invention.

As illustrated in FIGS. 6 and 7, a bump foil 706 or 706' consists of a first foil 706a or 706a' that forms the edge of the fan-shaped bump foil and has a substantially "⊏" shape, and a second foil 706b or 706b' that is arranged within the first foil 706a or 706a' and is spaced apart from the first foil 706a or 706a' with a slit 706c or 706c' interposed therebetween. The ends of the first foil 706a or 706a' and second foil 706b or 706b' may be welded to the plate 702 and the other ends thereof may extend in an arc direction of the fan-shaped bump foil. Since the air foil bearings illustrated in FIGS. 6 and 7 are designated by different reference numerals from but have the same structure as those of the embodiments illustrated in FIGS. 4 and 5, a detailed description thereof will be omitted.

The welded portion of FIG. 6 or 7 (corresponding to reference numeral 706f or 706f' of FIG. 4 or 5) is disposed in the direction of rotation of the rotor. The welded portion has a relatively smaller width, compared to the first foil 706a or 706a' and the second foil 706b or 706b', and maintains only a fixed state. In addition, since the welded portion is not formed with an uneven portion such as a bump ridge, the welded portion does not perform damping according to introduction and discharge of fluid but stably maintains a fixed state.

FIG. 8 is a graph illustrating a pressure distribution according to the air foil bearing of FIG. 6.

As illustrated in FIG. 8, when the bump foil 706 has uniform stiffness, the pressure of the bump foil 706 in the radial direction of the plate 702 (wherein, the center of the plate is defined as d1 and the outside thereof is defined as d2 at any point of FIG. 2) is set as P1. When the bump foil includes the first and second foils 706a and 706b, the pressure of the bump foil 706 in the radial direction of the plate 702 is set as P2. It can be seen that the pressure is concentrated between the radial inside d1 and the radial outside d2 in the case of P1, whereas the pressure relatively evenly distributed between the radial inside d1 and the radial outside d2 in the case of P2.

If the pressure is concentrated on one portion, the bump foil 706 frequently comes into contact with the top foil 704 in the above portion, which may lead to an increase in abrasion of the top foil 704. This also means that the edge of the bump foil 706 close to the radial inside d1 and outside d2 is not sufficiently pressed due to a low load support capability.

However, when the stiffness of the first foil 706a is set to be higher than the stiffness of the second foil 706b as in the embodiments of the present invention, the load support capability is enhanced with the consequence that the radial inside d1 and outside d2 may be sufficiently pressed. Thus, the pressure P2 is not concentrated on one portion but it is evenly distributed.

The air foil bearing according to the embodiments of the present invention having the above configuration can enhance a load support capability and increase a damping effect by changing the shape and stiffness of the bump foil. In addition, it is possible to enhance the durability of the bearing by an improvement in damping capability.

In the air foil bearing according to the embodiments of the present invention, it is possible to prevent the end of the bump foil from sharply protruding when the bump foil is deformed by changing the shape of the bump foil and the shape of the slit. Hereinafter, an embodiment in which shapes of a bump foil and a slit are changed will be described in detail, and the change of these shapes may be applied to the above embodiments. A detailed description of the same configuration as the above embodiments will be omitted. For convenience, the outer arc of the fan-shaped bump foil is defined as an outer diameter direction and the inner arc thereof is defined as an inner diameter direction in FIG. 9.

FIG. 9 is a top view illustrating an air foil bearing according to a fourth embodiment of the present invention.

As illustrated in FIG. 9, the air foil bearing includes a bump foil 706" arranged between a top fail 704" and a plate 702".

The bump foil 706" consists of first foils 706a" that are disposed at the outer and inner diameter sides of the top foil in the direction of rotation of a rotor (in the arrow direction of FIG. 5), and second foils 706b" that are disposed between the first foils 706a". In the present embodiment, an example in which the bump foil consists of two first foils and two second foils will be described. A trailing edge F is a portion that connects the first foils 706a" to the second foils 706b" in the end of the bump foil in the direction of rotation of the rotor.

As in the above embodiment, the bump foil 706" may individually adjust the stiffness of the first and second foils 706a" and 706b" by adjusting the widths (gaps) of slits 706c" and 706d" and the bump widths B to B" of the bump foil 706". In the present embodiment, it is possible to adjust the stiffness of the first and second foils by adjusting the bump widths B to B" of the second foils 706b" in detail.

In more detail, the bump foil 706" is divided by a plurality of slits 706c" and 706d", and a first slit 706c" between each of the first foils 706a" and the associated second foil 706b" has a shape different from a second slit 706d" between the second foils 706b".

The first slit 706c" located between each of the first foils 706a" and the associated second foil 706b" has the same width in the direction of rotation of the rotor. That is, the first slit 706c" has a uniform width from one end between the first foil 706a" and the second foil 706b" to an end toward the trailing edge F. In addition, the first slit 706c" is closed at the end of the trailing edge F and is open at an end opposite to the end of the trailing edge.

On the other hand, the second slit 706d" located between two second foils 706b" has a different width from one end thereof to an end toward the trailing edge F (the second slit is also open at the an end opposite to the end of the trailing edge).

The second foils 706b" consist of a foil having a long length in the direction of rotation of the rotor and a foil having a short length. The second slit 706d" located therebetween has a stepped shape, and the width of the second slit 706d" is narrowed toward the trailing edge F. That is, the second foils 706b" may have different bump widths B to B" from one end thereof to the other end thereof for each section.

Accordingly, the second foil 706b" having a relatively long length has a first stepped portion 7060 that is formed at one end thereof adjacent to the trailing edge F, a first connection portion 7061 that extends in a direction opposite to the trailing edge F from the first stepped portion 7060, a second stepped portion 7062 that is formed after the first connection portion 7061 extends by a predetermined length, and a second connection portion 7063 that extends toward an opposite end of the trailing edge F from the second stepped portion 7062. Since the stepped portions are directed in the outer diameter direction, the bump width B' of the first connection portion 7061 is larger than the bump width B of the second connection portion 7063.

The second foil 706b" having a relatively short length may have a third stepped portion 7065 that is formed at one side thereof facing the long second foil 706b" and is further spaced apart from the trailing edge F than the first stepped portion 7060. That is, the short second foil 706b" may have a third connection portion 7064 that is formed adjacent to the trailing edge F, and a fourth connection portion 7066 that is formed at an opposite side of the trailing edge F, and the third stepped portion 7065 may connect the third connection portion to the fourth connection portion. In this case, since the third stepped portion is directed in the inner diameter direction, the bump width (not shown) of the third connection portion 7064 is smaller than the bump width B" of the fourth connection portion 7066.

The bump width B of the second connection portion 7063 and the bump width B" of the fourth connection portion 7066 may be equal to or different from each other according to the specification of design.

The end of each of the first foils 706a", which is located opposite to the trailing edge F, is formed by spot welding. The height of the first foil 706a" (the highest bump pitch height of the bump foil in cross section) may be lowered by up to 50% compared to the second foils 706b". Thus, the central region (region E) including the second foils may have a relatively lower stiffness than the first foils 706b". In more detail, the welded first foils 706a" may have stiffness twice as much as the non-welded second foils 706b".

In addition, it is possible to adjust the stiffness of the trailing edge F portion by regulating the distance D from the ends of the slits 706c" and 706d" to the trailing edge F such that the trailing edge F portion has a higher stiffness than the central region (region E). Preferably, the distance D from the ends of the slits 706c" and 706d" to the trailing edge F is designed to be less than or equal to twice the bump pitch C (D≤2C).

In the air foil bearing of the fourth embodiment, it is possible to change the height of the bump ridge and the bump width in order to enhance a load support capability and a damping effect. A detailed structure thereof will be described with reference to the drawings. Since the bump foil of the present embodiment is de designated by reference numeral different from but have the same structure as that of the fourth embodiments, a detailed description thereof will be omitted.

FIG. 10 is a top view illustrating an air foil bearing according to a fifth embodiment of the present invention. FIG. 11 is a top view illustrating an air foil bearing according to a sixth embodiment of the present invention.

As illustrated in FIG. 10, the air foil bearing has a structure in which a bump foil 706 is inserted between a top foil 704 and a plate 702 and one end of the top foil 704 is a fixed end while the other end as a free end of the top foil 704 is spaced apart from the plate 702. Accordingly, the top foil 704 has an inclined section L1 in which the gap between the top foil 704 and the plate 702 is gradually increased from the fixed end of the top foil 704 to the free end thereof. The top foil 704 has a flat section L2 in which the gap between the top foil 704 and the plate 702 is constant at a predetermined position passing through the inclined section L1.

The flat section L2 is formed in a portion corresponding to the leading ridge A of the bump foil 706 in the direction of rotation of a rotor. The leading ridge A of each of first to fourth foils 706a to 706d is a starting position of the flat section L2.

When the leading ridge A of each of the first to fourth foils 706a to 706d is set to have a lower height than an adjacent bump ridge (second or more bump ridges) to form a gap between the leading ridge A and the highest point, a thin oil film is first formed according to the shape of the top foil 704 due to the film stiffness of the top foil 704 and the stiffness of the second or more hump ridges.

When the RPM or load of a rotor 610 is increased, the load applied to the bump foil 706 is gradually increased, thereby increasing the pressure of the oil film. In this case, when a thrust bearing 700 is deformed over a certain level, the lowered leading ridge A is deformed by contact with the top foil 704 to support a load (activation). In order for the leading ridge A to be uniformly pressed when it is activated, the leading ridge A is positioned in the flat section L2 of the top foil 704. Since the flat section L2 is increased while the leading ridge A supports a load, the thrust bearing 700 has a high load support capability.

To this end, the leading ridge A preferably has a height lowered by up to 30% compared to other bump ridges. That is, the leading ridge A has a height of 70% or less of the heights of other bump ridges.

When an air compressor 10 generates continuous vibration or short intermittent vibration in a vertical or horizontal direction to set the height of the leading ridge A, the rotor 610 is excited while vibrating by an external force. The rotor 610 has a set opening (a gap in an initial position) with respect to the thrust bearing 700 in an initial position, but the set opening is increased by excitation.

That is, the bump foil 706 is repeatedly pressed and restored. In connection with the displacement when the bump foil 706 is maximally pressed and restored, it can be seen that the bump foil 706 is pressed and restored by approximately 30% of the bump ridge of the bump foil 706 (measurement of displacement of the rotor over time).

Accordingly, when a pressure is applied to the thrust bearing 700 over a certain level by setting the height of the leading ridge A within 30% of the heights of other bump ridges, it is possible to suitably support the load corresponding to the pressure.

Alternatively, it is possible to change the lengths of second and third foils as in FIG. 11.

That is, the non-welded ends E of second and third foils 706b' and 706c' may be positioned on the same line as the imaginary line connecting the welded ends B of first and fourth foils 706a' and 706d'.

The air foil bearing according to the embodiments of the present invention having the above configuration can enhance a load support capability and increase a damping effect by changing the shape and stiffness of the bump foil. In addition, it is possible to enhance the durability of the bearing by an improvement in damping capability.

As is apparent from the above description, an air foil bearing according to exemplary embodiments of the present invention can adjust stiffness of single bumps by varying widths of the single bumps. In addition, since the bumps have the same height in an initial stage, a wedging effect is implemented only when a load is applied thereto by an oil film. Therefore, the air foil bearing is advantageous in terms of height management thereof.

Furthermore, it is possible to stably dampen shocks applied in the direction of rotation of a rotor, to improve a support capability, and to reduce shocks due to damping. Therefore, it is possible to enhance the durability of the air foil bearing.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An air foil bearing for rotatably supporting a rotary shaft, comprising:
    a disc-shaped plate, a plurality of bump foils coupled to the plate, and a top foil disposed above each of the bump foils while one end of the top foil is coupled to the plate and the other end thereof is a free end,
    wherein each of the bump foils comprises first to fourth foils extending from the coupled ends in a direction opposite to a direction of rotation of a rotor,
    wherein ends of the first to fourth foils are connected as one piece, and
    wherein a leading ridge (A) of each of the first to fourth foils, which is adjacent to the free end, has a height different from another adjacent bump ridge.

2. The air foil bearing according to claim 1, wherein the height of the leading ridge (A) of each of the first to fourth foils is lower than the height of another adjacent bump ridge in the direction of rotation of a rotor.

3. The air foil bearing according to claim 2, wherein the height of the leading ridge (A) of each of the first to fourth foils is set to be within 70% of the height of another adjacent bump ridge in the direction of rotation of a rotor.

4. The air foil bearing according to claim 3, wherein the top foil has an inclined section (L1) in which a gap between the top foil and the plate is gradually increased, and a flat section (L2) in which the gap therebetween is constant.

5. The air foil bearing according to claim 4, wherein the leading ridge (A) of each of the first to fourth foils corresponds to a starting position of the flat section (L2) of the top foil.

6. The air foil bearing according to claim 3, wherein an end (B) adjacent to the leading ridge (A) of each of the first to fourth foils is coupled to the plate by spot welding.

7. The air foil bearing according to claim 1, wherein the bump foil is divided into first to fourth foils by a plurality of slits.

8. The air foil bearing according to claim 7, wherein stiffness of the first to fourth foils is adjusted according to a width of each of the slits and a bump width of the bump foil.

9. The air foil bearing according to claim 8, wherein some of the first to fourth foils have different bump widths from one end thereof to the other end thereof.

10. The air foil bearing according to claim 7, wherein the plurality of slits have different shapes.

11. The air foil bearing according to claim 7, wherein the bump foil further comprises a trailing edge connecting the first foil to the second foil.

12. An air foil bearing for rotatably supporting a rotary shaft, comprising:
    a disc-shaped plate, a plurality of bump foils coupled to the plate, and a top foil disposed above each of the bump foils while one end of the top foil is coupled to the plate and the other end thereof is a free end,
    wherein each of the bump foils comprises first to fourth foils extending from the coupled ends in a direction opposite to a direction of rotation of a rotor
    wherein the bump foil is divided into first to fourth foils by a plurality of slits,
    wherein the bump foil further comprises a trailing edge connecting the first foil to the second foil, and
    wherein a distance (D) from an end of each of the slits to the trailing edge (F) is less than or equal to twice a bump pitch (C).

* * * * *